Patented Oct. 30, 1928.

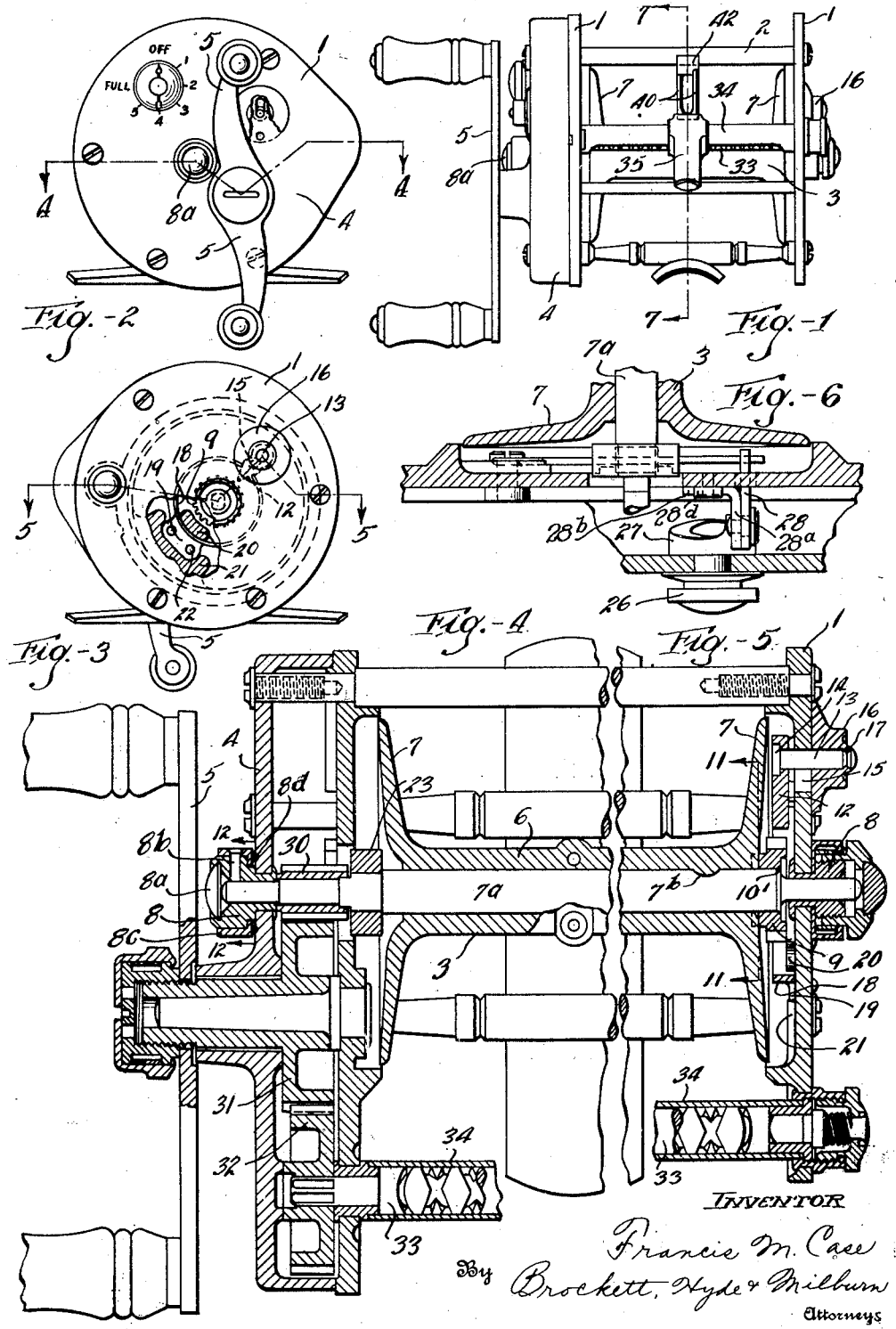

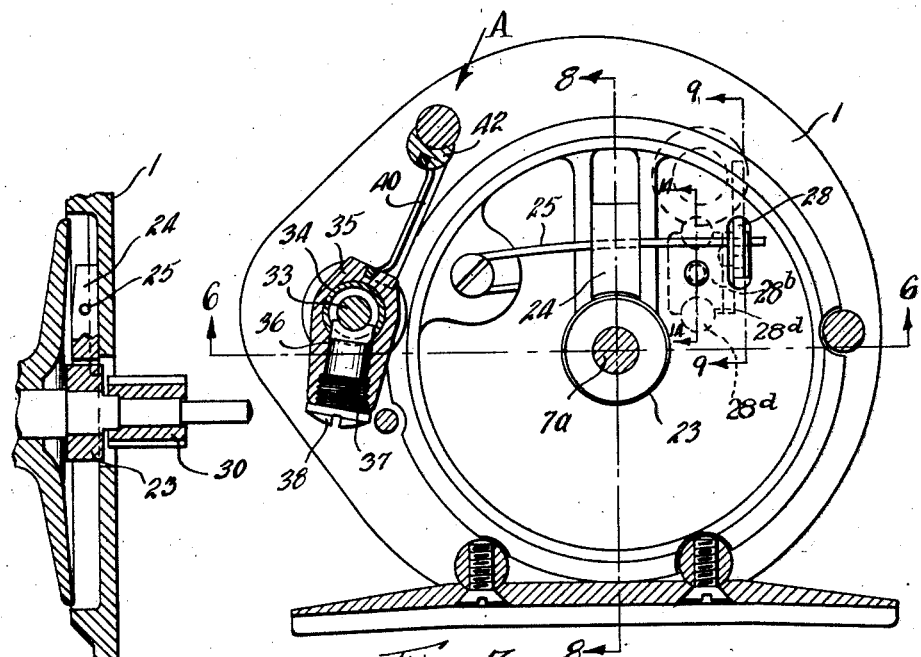
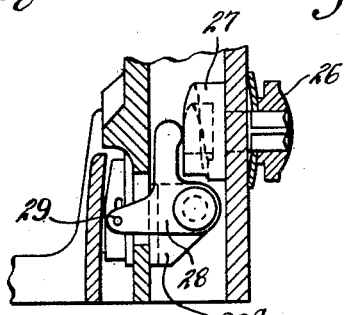
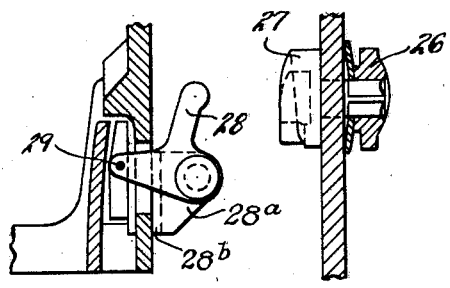
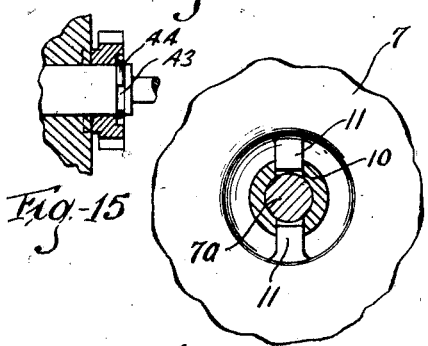
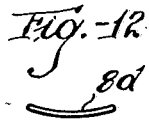
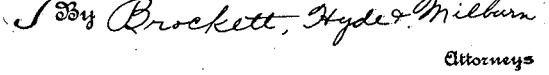

1,689,914

UNITED STATES PATENT OFFICE.

FRANCIS M. CASE, OF CLEVELAND HEIGHTS, OHIO, ASSIGNOR TO THE ENTERPRISE MANUFACTURING COMPANY, OF AKRON, OHIO, A CORPORATION OF OHIO.

FISHING REEL.

Application filed June 26, 1924. Serial No. 722,524.

This invention relates to fishing reels.

The general object of the present invention is to improve the construction of the click spring and the manner of mounting it upon one of the reel end heads.

Further objects of the invention are in part obvious and in part will appear more in detail hereinafter.

In the drawings, Fig. 1 represents a front elevation of a reel embodying the invention; Fig. 2 is an end elevation from the left in Fig. 1; Fig. 3 is an end elevation from the right in Fig. 1, the end plate being broken out to expose interior parts, some of which are in section; Fig. 4 is a mutilated section on approximately the line 4—4, Fig. 2; Fig. 5 is a detail cross section on the line 5—5, Fig. 5; Fig. 6, is a mutilated section on approximately the line 6—6, Fig. 7; Fig. 7 is a section on the line 7—7, Fig. 1; Fig. 8 is a detail section on the line 8—8, Fig. 7; Fig. 9 is a section on the line 9—9, Fig. 7, showing the brake mechanism; Fig. 10 is a view of the same parts in the position they occupy when the reel is disassembled; Fig. 11 is a detail section on the line 11—11, Fig. 5; Fig. 12 is taken on line 12—12 of Fig. 4; Fig. 13 is an elevation or edge view of the spring alone; Fig. 14, is a section on the line 14—14, Fig. 7; Fig. 15 is a detail view of a modified click pinion construction.

The reel shown in the drawings in many respects is similar to reels illustrated in my prior patents for fishing reels, No. 1,579,076, dated March 30, 1926 and No. 1,637,437, dated August 2, 1927 and in my prior application, Serial No. 629,040, filed March 21, 1923, to which reference may be had for more complete descriptions of parts, groups of parts or operating effects which either may not here be described or only generally so because unnecessary to a clear understanding of the invention here involved.

So far as description is here necessary, the reel comprises a suitable frame with end plates or heads 1 connected by pillars 2 and between which rotates a spool 3 operated by gearing in the gear casing 4 attached to one end head, the gears being actuated by the operating handle 5.

The spool is provided with the usual hub 6 and end flanges 7 between which flanges the line is wound. The spool has cast into its hub a shaft $7^a$ journaled in tubular bearing portions represented generally at 8 at both ends of the shaft. The outer end of the left bearing 8, as viewed in Fig. 4, is formed with an annular seat for a button $8^a$ of stainless steel and the marginal portion of the bearing is spun over the button so as to maintain the same in such position. The oiling hole $8^b$ through the same bearing may be opened and closed by the apertured rotatable ring $8^c$ which is held in set position by a spring $8^d$ which is in the form of a bowed split ring. This spring is located between the rotatable ring $8^c$ and the outside wall of the gear casing 4. The bearing 8 at the right end of the reel, as viewed in Fig. 4, has threaded thereon a cap member $8^d$ which is provided with an annular seat for a stainless steel button $8^a$, said button being held on its seat by spinning the metal of the cap over the marginal portion of said button. Heretofore, these buttons have been made of glass or agate, which were often broken in the spinning operation for securing the button to its seat, or were often later broken when the reel was dropped. With the use of stainless steel buttons, there is no liability of their being broken, either in the spinning operation by which they are secured to their seats, or afterwards, by dropping the reel.

On one end of the shaft is located a click pinion 9 which conveniently may be attached to the shaft for proper driving relation with the spool by a driving fit on said shaft and the provision on the inner end of the pinion hub of radial recesses 10 to receive wings 11 of the cast spool metal, as illustrated in Figs. 5 and 11. In this arrangement the pinion is held on by swaging the shaft into a tapered recess 10′ in the end of the pinion. This arrangement not only secures a positive driving connection, but enables the spool body, shaft and click pinion to be conveniently and readily attached to each other. The click pinion cooperates with a click pawl 12 rotatable upon a hardened steel pin 13 beneath the head 14 thereof. Said pin extends through a radial slot 15 in the end head to the outside thereof where it is provided with a permanently attached operating button 16 secured to the pin in any suitable manner, such as by beading a portion of the button metal into an annular groove 17 of the pin. With this arrangement it is possible to use a hardened steel pin and reduce the wear between the click pawl and pin and at the same time permanently attach the operating button to the pin.

The click pawl co-operates with a click spring shown in detail in Fig. 3. It comprises an annular split spring ring 18, through the gap in which the arrow-headed click pawl is adapted to be radially moved into and out of engagement with the click pinion. Said annular spring has an integral base plate portion 19 located in a seat in the end head between a boss 20 of the end head lying between the ring and click portion, as shown in Fig. 3, and an integral flange or wall 21 of the end head metal lying outside of the base portion 19 of the spring, the spring base being permanently secured in its seat with its lower surface engaging the end head, as by rivets 22. The engagement of these two opposed abutments 20, 21 with three side edges of the spring base 19 and with the annular spring portion provides an arrangement which not only solidly and firmly seats the click spring in place but materially facilitates its attachment and its location on the end head in proper co-operating relation with the click pawl.

At the opposite end of the reel, to wit, the left hand end, Fig. 1, is located anti-back lash or brake mechanism, represented in Figs. 7 to 10 inclusive. The spool shaft is here provided with a cylindrical brake drum 23, with the outer surface of which co-operates a brake member 24 held in braking position by a spring 25. Said brake member is actuated to vary its effect and move it into and out of braking position by a rotatable button 26 operating a cam 27 effective upon one arm of a bell-crank lever 28, the other arm of which has an opening 29 to receive one end of the spring 25. This brake mechanism is separable when the gear casing 4 is removed from the neighboring end head 1, as shown in Fig. 10, the cam 27 moving away from the bell-crank lever and permitting the brake to move to brake release position. The bell crank lever 28 is pivotally mounted upon a supporting bracket 28$^a$, the base plate portion 28$^b$ of which is riveted or otherwise suitably secured to one of the reel end heads, as clearly shown in Fig. 6. To facilitate the application and securement of this supporting bracket to the reel end head, and to also maintain said bracket in proper position upon said end head, the base portion 28$^b$ of said bracket is provided at one or both of its ends with a recess 28$^c$, Fig. 7, two being here shown, said recesses being adapted to receive or engage studs 28$^d$, Figs. 7 and 14, said studs being preferably formed integral with the reel end head.

The same end of the spool shaft is provided with a pinion 30 driven by a gear 31 actuated by the operating handle 5, gear 31 also rotating a gear 32 in driving relation with one end of the threaded shaft 33 of the line levelling mechanism. Said shaft 33 is enclosed within a slotted protecting tube 34, the tube and shaft being endwise disengageable from the driving gear 32 and endwise removable through an opening in the end head 1 at the click end of the reel, in the manner described in one of my prior applications referred to. The line levelling device is a carriage 35 sleeved and sliding upon the shaft protecting tube 34, said casing being provided with a traveller or nut 36 held in said carriage by a threaded plug 37 and engaging the threads of the screw shaft. By removing the plug 37 the nut or pawl 36 may be readily disengaged from the shaft to permit endwise removal of the shaft through the end head. To guide the line to the spool, the carriage 12 is provided with two upwardly extending substantially parallel plate members 40 joined at their upper ends by a block 42 having a recess to receive one of the pillars 2 connecting the end heads and along which pillar said block is adapted to slide.

In the modified form of click pinion construction shown in Fig. 15, the shaft is provided with a recess 43 beyond the end of the pinion and adapted to receive a split spring wire ring 44 which is forced into position in the groove and engages the end of the pinion and holds it in position.

The shaft may be provided with a recess 7$^b$ or any other suitable deformation which when cast within the spool hub provides a driving connection between the two.

What I claim is:

In a fishing reel, an end head, a click spring mounted thereon, said spring having a base plate portion and a click spring portion, said plate portion having its lower surface in engagement with said end head and having a plurality of side edges and said spring portion being integrally connected to one of said side edges, said end head being provided with an abutment member raised from the surface thereof and engaging the other side edges of said plate portion and with another abutment member, opposed to the said first named abutment member, engaging said spring portion adjacent its securement to the plate portion, whereby said click spring is maintained in proper position on said end head.

In testimony whereof I hereby affix my signature.

FRANCIS M. CASE.